March 23, 1954  R. K. SIMMS  2,673,078
SPARGING APPARATUS
Filed Sept. 6, 1949

INVENTOR.
R. K. SIMMS
BY Hudson + Young
ATTORNEYS

Patented Mar. 23, 1954

2,673,078

UNITED STATES PATENT OFFICE 2,673,078

SPARGING APPARATUS

Russell K. Simms, Bartlesville, Okla., assignor to Phillips Petroleum Company, a corporation of Delaware Application September 6, 1949, Serial No. 114,160

11 Claims. (Cl. 261—76)

This invention relates to the introduction of a fluid into a liquid. One aspect of this invention relates to apparatus for introducing a fluid into a liquid, particularly those which will interact violently. Another aspect of this invention relates to a new and improved sparger for introducing a fluid such as gas, vapor, or liquid into a conduit through which a fluid, usually a liquid, is flowing. A further aspect of this invention relates to an improved apparatus for sparging a fluid reactant into a stream of liquid with which it will react, or by which it is dissolved. In one embodiment, this invention relates to a device for sparging a fluid into a liquid which allows for movement of the liquid carrying conduit. In another embodiment, my invention relates to an apparatus for sparging anhydrous or aqua ammonia into an aqueous acid stream of an ammonium salt in such a manner that waterhammer, which often accompanies such introduction, is substantially eliminated.

The term "sparger" as referred to in this specification is used to identify an apparatus comprising a combination expansible means and means for introducing gaseous, vaporous or liquid material into a flowing stream of liquid with which said material interacts. The term also applies to a complete expansible and fluid-introducing assembly which may be inserted in a conduit. A sparger of this type is well adapted for use in manufacturing of salts of ammonia by direct neutralization of a suitable acid with ammonia. In such an apparatus, a vapor or liquid is admitted through a perforate section of conduit and the pulsation of the reacting liquid and movement of the conduit is absorbed or cushioned by an expansible means. Thus by sparging I mean the process of contacting a liquid with another fluid in which the fluid is sprayed into the liquid.

In a plant such as that used for producing ammonium salts or other crystalline materials by evaporation of the solvent from the solute, the solution of the material to be crystallized is evaporated until it is in the range between normal solubility and supersolubility, or in other words, within the metastable region. Theoretically, no crystals will be formed until the saturation passes the point of supersolubility, at which time, crystal nuclei will shock out. However, it is known that other factors, such as agitation and the like, will cause crystal formation below the point of supersolubility. In actual plant operation, the solution of material to be crystallized is evaporated to an optimum point between the point of normal solubility and supersolubility where a minimum of crystal nuclei will be formed and yet appreciable supersaturation is obtained.

A suitable apparatus for carrying out such an evaporation and crystallization process may comprise an evaporator positioned above a crystallizer and connected thereto by means of a barometric leg which extends into the crystallizer, such as an Oslo or Krystal type evaporative-crystallizer. Examples of this type of crystallization apparatus may be found in copending applications, Serial No. 112,589, filed August 26, 1949, now Patent 2,623,814 dated December 30, 1952, Serial No. 97,467, filed June 6, 1949; or in U. S. Patents 2,164,112 and 2,375,922 to F. Jeremiassen. The solution which is supersaturated in the evaporator is passed downward through the barometric leg to the crystallizer where it contacts crystals, causing them to grow, and reducing its own saturation. The solution which is no longer as saturated is then passed through a riser back to the evaporator. Additional acid or other material, depending on the product being made, is introduced to the solution at a point along the riser. Reactant fluid such as anhydrous ammonia or aqua ammonia is added above this point, by means of a sparger, in a sufficient quantity to react with the liquid and thus form more crystallizable material. The injection of the fluid reactant into the riser will result in boiling and bumping of the liquid in the conduit. There may also be considerable pounding or water-hammer due to the rapid collapsing of bubbles of vapor as they react with the liquid or as they are dissolved therein. I have also found that water-hammer is caused by too little pressure differential between the sparger and the riser. Because of this, a fluid pressure is built up in the sparger and then finally becomes great enough to be released into the riser through the large opening of the conventional sparger provided for expansion. Liquid immediately rushes into the sparger through this opening and hits the walls thereof, making the noise known as water-hammer. Consequently, it is essential that some means be provided for cushioning the apparatus to avoid damage from pulsations caused by such water-hammer and to reduce same to a minimum.

I have also found that a fluid such as ammonia must be continuously and uniformly sparged into the circulating liquid so that it may interact completely with the liquid before same is passed to the evaporator. Any unreacted fluid may be lost in the evaporator, especially when it is as volatile as ammonia. On the other hand, if ammonia or other fluid is sparged so that there is a deficiency of the gas with respect to the liquid reactant, the liquid will contain an excess of reactant. Under such a condition, the amount of supersaturation produced in the evaporator is reduced and thus the rate of product manufactured by a given unit. Further, it has been found in the production of ammonium salts that the pH of the crystallizing solution must be controlled within rather narrow limits in order to produce rhombic crystals of desired size. If the pH is not so controlled on making crystalline ammonium sulfate, small needle crystals which are undesirable from many standpoints are produced. By using the method and apparatus of my invention, the difficulties often encountered when sparging a fluid into a liquid are eliminated.

Further, the addition of the fluid to the liquid and the interaction therebetween often causes a rise in temperature of the liquid and a consequent expansion of the apparatus including the conduit or riser through which the material is carried to the evaporator. Thus, it is also necessary to provide a suitable means for expansion and contraction, particularly longitudinally, so that neither the evaporator nor the crystallizer or pumping equipment in the riser are damaged.

For efficient sparging of a fluid into a stream of liquid or other fluid with which it reacts or by which it is rapidly dissolved, I have found that the fluid should be introduced in a plurality of small streams, preferably uniformly distributed around the liquid stream. If the fluid is admitted through relatively large inlets, the reaction with the liquid reactant or dissolution therein becomes violent and causes the previously discussed waterhammer. When such a practice is followed, a portion of the fluid is often not reacted, thus leading to a possible economic loss of materials particularly if the fluid is a vapor or a volatile liquid. Such a loss may be especially prevalent when the reactant vapor is ammonia. By using the apparatus of my invention, the difficulties often encountered when sparging a fluid into a liquid are eliminated.

An object of this invention is to provide an improved method and apparatus for introducing a fluid into a liquid.

Another object of this invention is to provide an improved apparatus for introducing gaseous, vaporous, or liquid reactants into a liquid with which they are reacted or by which they are dissolved.

Another object of this invention is to reduce substantially the water-hammer occasioned at the point of introduction of fluid into a flowing liquid reactant or solvent.

Another object is to provide a method for sparging a fluid at a uniform rate, whereby the fluid is injected at a rate not to exceed the rate of interaction with the liquid.

A still further object is to provide an apparatus whereby a fluid is injected at a desired rate into a liquid.

Another object is to provide an apparatus for sparging a fluid into a liquid which also acts as an expansion and shock absorbing means.

Another object is to provide an improved method for sparging anhydrous or aqua ammonia into an acid liquor.

Another object is to provide an apparatus for sparging ammonia at a closely controllable rate into an acid liquor.

Other objects and advantages of my invention will be apparent to one skilled in the art from the accompanying disclosure and discussion.

In accordance with my invention, I have provided an improved sparging apparatus by the use of which I am able to control accurately the rate of introduction of a fluid into a liquid reactant or solvent. For example, in the manufacture of ammonium salts, I am able to control the amount of ammonia introduced to an acid liquor to such a degree that there is neither an excess of ammonia to be lost in subsequent evaporation nor a deficiency thereof, resulting in a high acid liquor and thus a decreased rate of production.

In using the apparatus of my invention, a gaseous, vaporous, or liquid reactant, or material to be dissolved in a liquid, is introduced passing through a sparger through a plurality of very small openings positioned within a relatively small area of the circulating line leading from a crystallizer to an evaporator, or from one unit to another when other than a crystallization process is being used. The vapor must be introduced in streams small enough that the vapor on contacting the liquid is immediately interacted therewith. Therefore, in accordance with my invention the fluid is introduced in a large number of high velocity streams of bubbles in a given cross-section of a circulating line in such a manner that no matter how small a quantity of fluid is introduced to the liquid in the circulating line, it may be introduced in a fine stream of bubbles or liquid of almost a chain-like appearance and at a high rate of flow. Thus, when ammonia is sparged into an acid liquor for example, there will be no localized concentrations of acid or ammonia which will cause hammering or bumping in the circulating line.

The sparger of my invention comprises a conduit, a coaxially positioned housing forming an annular space therebetween, closure means for the ends of the thus formed annular space, and fluid inlet means to the annular space. The portion of conduit surrounded by the housing is provided with a great number of small holes or perforations for passing a fluid from the annular space into a stream of material flowed through the conduit. The problem solved by means of my invention arises when it is desired to vary the quantity of fluid passed into the material flowing through the conduit. It has been found that when the rate of flow of the introduced fluid falls below a certain level, pounding and hammering takes place within the conduit. I have found that a very successful solution to this problem is to divide the annular space into sections or zones and providing an individual fluid inlet to each section with means for regulating the flow therethrough. It is preferable that these partitions be placed in a plane at right angles to the axis of the circulating line, however, they may also be placed other than this such as spiraling around the annular space. In this manner, zones all of one size or of different sizes may be made. The perforations within the zones formed by the partitions may be all of one size or of varying size. For example, one zone may have perforations all larger than those in the zone next thereto, or the size of the holes in the zones may progressively increase or decrease, each zone having holes of a different size to those in the next zone. The fluid introduced into the zones may be controlled automatically such as by pressure differential through the conduit or by the composition of the liquid in the conduit such as acidity, alkalinity, etc., or manually. The controls may be so set up that one or more zones may be closed off thus allowing fluid to enter only the desired zones and from there pass into the conduit.

It has actually been found that hammering and bumping in the circulating line of an ammonium salt producing apparatus will rupture or crack a sparger and cause interruptions in plant operation. Even with the improved method of sparging of this invention, there is still some boiling and turbulence in the circulating liquor line due to the reaction of the fluid with the liquid and consequently, it is frequently desirable and often necessary to provide shock absorbing means in the reaction section of the circulating line, as around the sparging area. Such shock absorbing means is supplied in accordance with my invention by a corrugated perforate conduit surrounded by a corrugated shell. This apparatus not only absorbs shock caused by interaction of the materials in the liquid carrying conduit, but also allows for expansion and contraction caused by heating and cooling. The corrugations may usually be shaped in straight, parallel, regular, and equally curved ridges and hollows. In most cases such corrugations are in planes at a right angle to the axis of the conduit, however, they may also be helically positioned and also of such shape that the hollows may be larger or of different sizes than the ridges or vice versa.

The following discussions of the drawings will more fully disclose the apparatus of my invention and will give a more clear understanding of some of the many aspects thereof.

Figure 1:
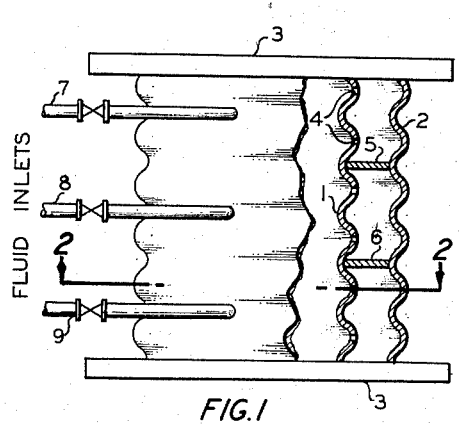
Figure 1 is a front elevation of one embodiment of the sparger of my invention partially in cut away section.

Refer now to Figure 1 which is a front elevation partially in cut away section. Number 1 indicates a perforate, corrugated conduit through which a liquid may be passed, said conduit being generally cylindrical in shape. Number 2 is an outer conduit or shell which is similarly corrugated to conduit 1 and concentric therewith. The thus indicated corrugations provde expanding and shock absorbing means. Numbers 3 indicate flanges attached to the ends of said conduits in a rigid manner forming a sparger which may be placed in a suitable line through which a liquid is passed and into which a fluid is to be introduced. Numbers 4 represent perforations in the walls of conduit 1 through which the fluid is passed. Numbers 5 and 6 represent horizontal partitions positioned within the annular space between conduits 1 and 2 for providing a positive separation between the zones of the annular space. Valved pipes 7, 8 and 9 are provided for introducing fluid into the annular space provided between conduits 1 and 2 and separated by partitions 5 and 6. The flow of fluid through these lines may be controlled as desired and may be completely shut off when necessary. By so operating, it is possible to maintain a high flow rate of a gas into the liquid and yet provide introduction of only a small quantity or a variable quantity of the fluid.

Although the above apparatus is described with reference to flanges which close the ends of the annular space between the conduit and shell, it is well within the scope of my invention to decrease the diameter of the ends of the shell to such a degree that they may be fastened to the conduit in a gas-tight manner.

Figure 2:
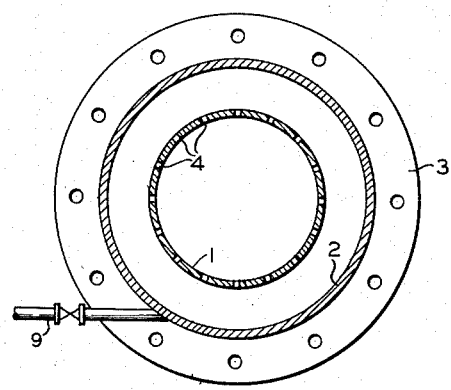
Figure 2 is a horizontal cross section taken along line 2—2 of Figure 1.

Figure 2 is a horizontal cross section taken along line 2—2 of Figure 1. The portions of this drawing carried over from Figure 1 are numbered similar to those in Figure 1. Therefore, number 1 is the inner perforate corrugated conduit, number 2 is the outer corrugated shell, number 3 is one of the flanges for attaching the sparger to a particular line, and 9 is the fluid inlet to the annular space between conduits 1 and 2. As shown in this drawing, inlet 9 is in an almost tangential position with respect to outer shell 2 and also the annular space between said shell and conduit 1. This provides for a circular flow of fluid around the annular space which when a vapor is sparged helps to maintain a more even pressure around the inner conduit 1. It is, however, within the scope of the invention to position fluid inlet 9 other than tangentially, except radially, and therefore the invention in its broader scope is not limited to this particular preferred embodiment.

Figure 3:
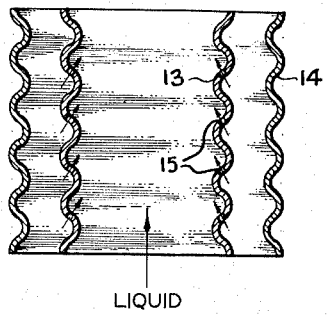
Figure 3 is a vertical cross section of a portion of the conduit and shell of another embodiment of my invention.

Figure 3 is a vertical cross-section of a portion of the conduit 13 and shell 14 and is an embodiment of my improved sparger wherein the perforations 15 are positioned such that the flow of fluid therethrough is in the direction of flow of the liquid through inner conduit 13. By so positioning the inlets the flow of material through conduit 13 is aided. Neither fluid inlet means nor partitions have been shown in this drawing inasmuch as they may be the same as in the previously discussed embodiments of my invention.

Figure 4:
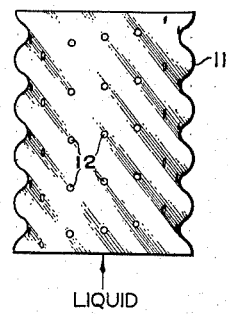
Figure 4 is a front elevation of a portion of the perforate inner corrugated conduit of still another embodiment of the sparger of my invention.

Figure 4 is a front elevation of a portion of the inner corrugated shell 11 containing perforations 12 of another embodiment of the sparger of my invention in which the corrugations are in a helical position. Advantages of this type of sparger are that there is not as much resistance to the flow of material through the inner conduit, and the material passed through the inner conduit and the fluid introduced thereto are rotated and mixed in a manner which promotes rapid interaction. Neither fluid inlet means nor partitions nor flanges have been shown in this drawing inasmuch as they may be the same as in Figure 1.

It is preferable to construct my improved sparger from corrosion-resistant material, such as 316 stainless steel, Monel, etc. although other acid-resistant material such as ceramic, plastic, or rubber may be used for the inner conduit instead of metal. The perforations in the inner shell may range from $1/64$ of an inch to $1/4$ of an inch, but it is usually preferable to maintain their size within the range of $1/32$ to $1/16$ of an inch. When flexible materials such as some plastics or rubber are used to construct the inner conduit it is not necessary to have it corrugated, there being enough resilience in the material itself to absorb any mechanical shock.

*Example*

My invention may be advantageously applied to a slightly modified Oslo crystallizer in which a saturated liquid as of ammonium sulfate containing from 0 to about 0.5 per cent excess of sulfuric acid passes from the upper portion of the suspension container or crystallizer into a riser or circulating line, which connects with the evaporator, at the rate of about 10,000 gallons per minute. Sulfuric acid of 98 per cent purity is injected into the circulating line at a rate of about 10½ gallons per minute. About 20 gallons per minute of water are injected near the acid injection point to provide about three-quarters of a pound of water for evaporation per pound of ammonium sulfate formed. (Acid of a purity less than 98 per cent may be used, and when this is done the amount of water introduced to remove heat by evaporation is concomitantly reduced.) The acid liquor passes into a circulating pump and therefrom through a conduit into the evaporator. Anhydrous ammonia is sparged into the circulating stream at a point downstream of the circulating pump at a rate of 53 pounds per minute, by means of the sparger shown in Figure 1 of the attached drawings. The evaporator is maintained under a vacuum of 24 to 26 inches of mercury by means of a barometric condenser and a steam ejector. The heat of reaction and the heat of crystallization are removed by evaporation of the water above-mentioned. The liquor which has been supersaturated in the evaporator is passed downwardly through a barometric leg into the crystallizer and is discharged near the bottom thereof. The supersaturated solution contacts crystals in the crystallizer thereby causing them to grow and concomitantly become less saturated in the process. The larger crystals settle to the bottom of the crystallizer and are withdrawn with mother liquor as a crystal magma. This magma is passed to suitable separation equipment, where the crystals are recovered, and from which the mother liquor is returned to the evaporative crystallizer.

The above unit will produce ammonium sulfate crystals of which about 97 per cent are plus 60 mesh in size. The acid and ammonia rates are preferably so adjusted as to maintain free acid content of the liquor in the range of 0.2 to 0.5 per cent.

Particular advantages of the apparatus of my invention are uniform sparging of a fluid into a liquid at such a rate that there is a minimum of water-hammer and turbulence caused by the reaction of the fluid with the liquid or dissolution of the fluid in liquid. My invention also provides uniform and easy control of the volume of fluid to be introduced to a liquid, maintaining a suitable flow rate of the fluid. Further, my invention provides an apparatus which will withstand movement caused by expansion and contraction of the cooperating apparatus and by the turbulence of the liquid passing therethrough.

Although this process and apparatus have been described and exemplified in terms of preferred modifications, it is understood that various changes may be made without departing from the spirit and scope of the disclosure and of the claims.

I claim:

1. A sparger comprising an inner perforate conduit and an outer shell axially positioned therewith and forming an annular space therebetween, means for closing the ends of said annular space, partition means for dividing said annular space into a plurality of zones, inlet means for fluids to each of the thus formed zones, and means for passing said fluids into said conduit through said perforations at a controlled rate.

2. A sparger comprising an inner perforate corrugate conduit and an outer corrugate shell axially positioned therewith and forming an annular space therebetween, the corrugations allowing for longitudinal movement of said conduits, closure members for the ends of said annular space, partition means for dividing said annular space into a plurality of zones, fluid inlets to each of the thus formed zones, and means for controlling the rate of introduction of fluid to each of said zones.

3. A sparger according to claim 2 wherein the corrugations are positioned in a plane at right angles with respect to the axis of said sparger.

4. A sparger according to claim 2 wherein the corrugations are spirally positioned with respect to said conduit.

5. A sparger according to claim 2 wherein said corrugate conduit and shell are cylindrical.

6. A sparger according to claim 2 wherein the perforations in said conduit are on radii of said conduit.

7. A sparger according to claim 2 wherein the perforations in said conduit are positioned such as to introduce a fluid in the direction of flow of the liquid passing through the conduit.

8. A sparger according to claim 2 wherein the diameter of the perforations in said conduit are in the range of $\frac{1}{64}$ to $\frac{1}{4}$ inch.

9. A sparger according to claim 2 wherein the corrugations of said conduit and said shell are of a helical design.

10. A sparger comprising a perforated inner cylindrical corrugated conduit, an outer corrugated cylindrical housing of larger diameter coaxially positioned around the inner corrugated conduit forming an annular space therebetween, closure means for the ends of the annular space thus formed, partition means for dividing said annular space into a plurality of annular sections, separate inlet means for the flow of fluid to each of the annular sections.

11. A process for introducing a fluid into a flowing liquid for dissolution or reaction so as to reduce substantially the water-hammer occasioned by varying the quantity of fluid passed into the liquid which comprises passing the liquid through an inner perforate corrugate conduit having an outer corrugate shell axially positioned therewith forming an externally closed annular space therebetween, the corrugations allowing for longitudinal movement of the conduit and shell in case of water-hammer, dividing said annular space into annular sections, and introducing fluid through individual fluid inlets of each section into any desired number of annular sections thus maintaining a high velocity flow of fluid into the liquid while providing a variable quantity of fluid.

RUSSELL K. SIMMS.

References Cited in the file of this patent

UNITED STATES PATENTS

| Number | Name | Date |
|---|---|---|
| 145,538 | Stoddart | Dec. 16, 1873 |
| 953,960 | Koppers | Apr. 5, 1910 |
| 1,475,441 | Leblanc | Nov. 27, 1923 |
| 1,541,853 | Rottmann | June 16, 1925 |
| 1,747,687 | Wheeler | Feb. 18, 1930 |
| 2,104,330 | Lockey | Jan. 4, 1938 |
| 2,263,892 | Schaer | Nov. 25, 1941 |
| 2,356,530 | Pflock | Aug. 22, 1944 |